US012253646B2

(12) United States Patent
Song et al.

(10) Patent No.: US 12,253,646 B2
(45) Date of Patent: Mar. 18, 2025

(54) INTELLIGENT DATA ACQUISITION FOR WIRELINE LOGGING

(71) Applicant: Schlumberger Technology Corporation, Sugar Land, TX (US)

(72) Inventors: Yi-Qiao Song, Newton Center, MA (US); Yiqiao Tang, Belmont, MA (US); Mehdi Hizem, Houston, TX (US); Lukasz Zielinski, Arlington, MA (US); Michel Claverie, Cambridge, MA (US); Zhanguo Shi, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 314 days.

(21) Appl. No.: 17/754,627

(22) PCT Filed: Oct. 8, 2020

(86) PCT No.: PCT/US2020/054779
§ 371 (c)(1),
(2) Date: Apr. 7, 2022

(87) PCT Pub. No.: WO2021/072071
PCT Pub. Date: Apr. 15, 2021

(65) Prior Publication Data
US 2022/0365241 A1 Nov. 17, 2022

Related U.S. Application Data

(60) Provisional application No. 62/912,491, filed on Oct. 8, 2019.

(51) Int. Cl.
*G01V 3/32* (2006.01)
*G01V 3/34* (2006.01)

(52) U.S. Cl.
CPC . *G01V 3/32* (2013.01); *G01V 3/34* (2013.01)

(58) Field of Classification Search
CPC .................................. G01V 3/32; G01V 3/34
See application file for complete search history.

(56) References Cited

U.S. PATENT DOCUMENTS 5,023,551 A 6/1991 Kleinberg et al.
5,486,762 A * 1/1996 Freedman ............ G01N 24/081
324/303

(Continued)

FOREIGN PATENT DOCUMENTS

WO 03032013 A1 4/2003

OTHER PUBLICATIONS

International Preliminary Report on Patentability issued in PCT Application No. PCT/US2020/054779 dated Apr. 21, 2022, 7 pages.

(Continued)

*Primary Examiner* — Mohamed Charioui
*Assistant Examiner* — Lynda Dinh
(74) *Attorney, Agent, or Firm* — Jeffrey D. Frantz

(57) ABSTRACT

Methods and systems are provided for optimizing well-logging using an optimized wait time determined by analysis nuclear magnetic resonance data to achieve faster and better quality borehole evaluation. The method comprises performing a nuclear magnetic resonance pre-log testing; identifying a wait time for a portion of a signal from the pre-log testing with a long T1 and T2, value at each depth of the pre-log testing, wherein T1 is defined as a longitudinal relaxation time and T2 is a transverse relaxation time ascertained from the nuclear magnetic resonance prelog testing; and constructing a logging program with a logging program wait time being consistent with the wait time identified.

16 Claims, 6 Drawing Sheets

(56) References Cited

U.S. PATENT DOCUMENTS

| | | | |
|---|---|---|---|
| 6,216,789 B1* | 4/2001 | Lorsignol | E21B 19/09 |
| | | | 254/266 |
| 6,462,542 B1 | 10/2002 | Venkataramanan et al. | |
| 6,531,868 B2* | 3/2003 | Prammer | G01N 24/081 |
| | | | 324/303 |
| 7,199,580 B2* | 4/2007 | Akkurt | G01N 24/081 |
| | | | 324/303 |
| 7,511,487 B2* | 3/2009 | Badry | G01R 33/3808 |
| | | | 324/303 |
| 9,671,525 B2* | 6/2017 | Al-Ibrahim | G01V 3/32 |
| 10,168,444 B2* | 1/2019 | Jachmann | G01V 3/32 |
| 2005/0257610 A1 | 11/2005 | Gillen et al. | |
| 2009/0167302 A1 | 7/2009 | Edwards et al. | |
| 2016/0124109 A1 | 5/2016 | Yarman et al. | |
| 2016/0170071 A1 | 6/2016 | Yang et al. | |
| 2016/0334533 A1 | 11/2016 | Coman | |
| 2017/0351002 A1* | 12/2017 | Coman | G01V 3/38 |
| 2018/0348319 A1* | 12/2018 | Li | G01V 3/32 |
| 2021/0199838 A1 | 7/2021 | Tang et al. | |
| 2023/0107374 A1 | 4/2023 | Huh | |

OTHER PUBLICATIONS

H. Y. Carr and E. M. Purcell, Effects of diffusion on free precession in Nuclear Magnetic Resonance experiments. Phys. Rev., 94:630-638, 1954.

S. Meiboom and D. Gill, Modified SpinEcho method for measuring nuclear relaxation times. Rev. Sci. Instrum., 29:688-691, 1958.

Hurlimann, M. D., et al. "Hydrocarbon composition from NMR diffusion and relaxation data." Petrophysics 50.02, pp. 116-129 (2009).

Y.-Q. Song, Magnetic Resonance of Porous Media (MRPM): A perspective, J Magn Reson 229 (2013) 12-24.

Yi-Qiao Song, Ravinath Kausik, "NMR application in unconventional shale reservoirs—A new porous media research frontier", Progress in Nuclear Magnetic Resonance Spectroscopy 112-113 (2019) 17-33.

P. Hook et al., Improved precision magnetic resonance, acquisition: application to shale evaluation, SPE-146883 presented at the SPE Annual Technical Conference and Exhibition, Denver, Colorado, USA, Oct. 30-Nov. 2, 2011 (8 pages).

R. Kausik et al., Characterization of gas dynamics in kerogen nanopores by NMR, SPE-147198 presented at the SPE Annual Technical Conference and Exhibition, Denver, Colorado, USA, Oct. 30-Nov. 2, 2011, pp. 1-16.

Song, Y.-Q. et al., (2002). T(1)—T(2) correlation spectra obtained using a fast two-dimensional Laplace inversion. Journal of Magnetic Resonance (San Diego, Calif : 1997), 154(2), 261-268.

International Search Report and Written Opinion issued in PCT Application PCT/US2020/054779, dated Jan. 29, 2021 (14 pages).

Extended Search Report issued in European Patent Application No. 20874048.0 dated Apr. 4, 2024, 8 pages.

* cited by examiner

INTELLIGENT DATA ACQUISITION FOR WIRELINE LOGGING

CROSS-REFERENCE TO RELATED APPLICATIONS

The present application is a National Stage Entry of International Application No. PCT/US2020/054779, filed Oct. 8, 2020, which claims priority to U.S. Provisional Patent Application Ser. No. 62/912,491 entitled INTELLIGENT DATA ACQUISITION FOR WIRELINE LOGGING, filed Oct. 8, 2019, the entirety of which is incorporated by reference.

FIELD OF THE DISCLOSURE

Aspects of the present disclosure relate to well logging. More particularly, aspects of the disclosure relate to Nuclear Magnetic Resonance ("NMR") well-logging for hydrocarbon exploration and field development.

BACKGROUND INFORMATION

Downhole logs are used to determine physical, chemical, and structural properties of formations (rocks and fluids) penetrated by drilling. The data is rapidly collected, continuous with depth, and measure in situ properties and can be used to interpret a formation's stratigraphy, lithology, mineralogy and fluid properties.

Multiple logging tools are often joined together in a "tool string" so that several measurements can be made when the tool string travels along a wellbore. The tool strings are lowered to the bottom of the borehole typically on a wireline cable, and data is collected as the tool string is pulled back up the hole. In fact, it is also customary to perform measurement/logging as the tool string is descending and the data acquired during the descent is called a "down-log" or job archive; the data acquired during the ascent of the tools from the bottom is called an "up-log". The term down-log is often used when the data collected during the tool descent is planned with the client with specific logging parameters and is a part of a commercial delivery. When it is not demanded as a commercial delivery, the data is often called a job archive. In this disclosure, these terms may be used interchangeably and are known collectively as a "pre-log".

There are also several conveyances of the tool strings to the bottom of the wells, such as drill pipe assisted approach and with tractors. The tools may even be pushed downhole by mud circulation.

Repeated runs are made in some wells to improve coverage and confirm the accuracy of log data. As a result, a logging job could have several pre-logs and up-logs. The up-log data is typically considered of higher quality as the logging speed is better controlled. The pre-logs are not routinely used for petrophysical interpretation.

A tool string typically includes several tools for multiple measurements, such as a pulsed neutron tool to determine neutron density and porosity, induction tool for resistivity, density log to determine bulk density, nuclear spectroscopy (e.g. Schlumberger Lithoscanner) to determine mineralogy, and magnetic resonance (e.g. CMR) to determine pore size and fluid properties. Each tool within the tool string can communicate with the surface logging control system (e.g. computer) in order to determine tool configuration and logging parameters. Typically, a surface system will determine a logging speed through the control of the winch drive. The logging speed is often a significant parameter in determining the quality of the log and often a slower speed is desirable to achieve a better signal-to-noise ratio. Slower logging speeds, however, will cause the logging operation to be more costly. As a result, prior to a logging operation, careful planning is required to balance the need for accuracy and the time/cost of the operation. Also, certain tool settings may affect the quality of the data and the condition of the tools. For example, high electrical power may be needed to generate more neutrons for better statistics and accuracy, however, higher power/voltage may shorten the lifetime of the neutron generator. High power for CMR+ in high saline environment may cause tool failure.

During a logging job, the tool configuration (such as the acquisition parameters and the selection of powered and enabled tools, etc.) can be changed from the surface computer. For example, when the tool string reaches the bottom of the well, the logging program can be updated for the up-log portion of the project. Oftentimes, however, the execution of the well-logging uses a predefined logging program and configuration without change at different depths or is not fully optimized for an efficient data acquisition.

Prior to the execution of the logging job, the logging program is designed by selecting a series of tools appropriate for the clients' needs in formation evaluation and the capability of the tools. The configuration of each tool is determined based on the expected well conditions, such as formation properties, mineralogy and fluid properties, as well as the specific goal of the logging campaign. For example, the neutron measurement of porosity requires knowledge of formation lithology/mineralogy (such as sandstone, carbonate or shales) and such parameters may be needed for real-time interpretation. For NMR logging, the heavy and light oils exhibit different relaxation rates and thus different measurement protocols are typically used and downloaded to the tool for proper measurements and interpretation.

Well-logging tools have internal configuration parameters that determine tool operation. For example, Schlumberger's accelerator porosity sonde (APS) uses a pulsed neutron generator to produce neutrons for measurements. The neutron flux directly determines the measurement quality and accuracy. In such systems, neutrons are produced by creating ions of deuterium, tritium, or deuterium and tritium and accelerating these into a hydride target loaded with deuterium, tritium, or deuterium and tritium. As a result, the neutron flux is determined and can be adjusted by the operation of the ion source, target, and accelerator. In particular, configuration parameters such as the ion source current and bias voltage are important for the neutron generation.

Schlumberger's Lithoscanner uses a pulsed neutron generator (PNG) and a cerium-doped lanthanum bromide (LaBr3:Ce) gamma ray detector to provide quantitative measurements of elements and mineralogy. For these spectroscopy measurements, since the signal is divided into many gamma ray energies, the detector count rate at each energy can be much lower than the total count rate. As a result, for certain formations and measurement requirements, the logging speed may be reduced.

Another example of reduced logging speed is magnetic resonance logging due to the measurement physics. In some instances, the operation of an NMR tool may require more power when the borehole fluid is highly saline that may further degrade the measurement quality. As a result, it is likely desirable to recognize the logging condition and formation properties in real-time in order to adjust logging parameters to improve logging efficiency.

Nuclear magnetic resonance (NMR) involves the application of a magnetic field to an object that impacts the magnetic moment (spin) of an atom in the object. In general, the magnetic field causes the atoms in the object to align along and oscillate (precess) about the axis of the applied magnetic field. The spin of the atoms can be measured. Of interest is the return to equilibrium of this magnetization, i.e., relaxation. For example, a state of non-equilibrium occurs after the magnetic field is released and the atoms begin to relax from their forced alignment. Longitudinal relaxation due to energy exchange between the spins of the atoms and the surrounding lattice (spin-lattice relaxation) is usually denoted by a time T1 when the longitudinal magnetization has returned to a predetermined percentage (i.e., 63%) of its final value. Longitudinal relaxation involves the component of the spin parallel or anti-parallel to the direction of the magnetic field. Transverse relaxation that results from spins getting out of phase is usually denoted by time T2 when the transverse magnetization has lost a predetermined percentage (i.e., 63%) of its original value. The transverse relaxation involves the components of the spin oriented orthogonal to the axis of the applied magnetic field. The T2 measurement is often performed using the well-established Carr-Purcell-Meiboom-Gill (CPMG) pulse sequence (See Carr et al., "Effects of diffusion on free precession in NMR experiments", Phys. Rev., 94:630-638, 1954 and Meiboom et al., "Modified spin-echo method for measuring nuclear relaxation times", Rev. Sci. Instrum., 29:688-691, 1958) which utilizes an initial 90-degree excitation pulse followed by a series of 180-degree (pi) refocusing pulses, and the data is typically analyzed using a Laplace inversion technique or an exponential curve fit.

NMR relaxation such as measured by T2 has been shown to be directly proportional to the surface-to-volume ratio of a porous material according to equation 1 recited below:

$$\frac{1}{T_2} = \rho \cdot \frac{S}{V_p} + \frac{1}{T_{2b}} \quad (1)$$

where S is the total surface area of the material, $V_p$ is the pore volume, and $\rho$ is the surface relaxivity (which is related to wettability), and T2b is the bulk relaxation time. Here the diffusion contribution is ignored since it is a weak effect in most of standard NMR well-logging program using short echo spacing. Surface relaxivity $\rho$ is a quantity (in micron/s) that defines the strength of the surface relaxation phenomenon. Because of this relationship, NMR is extensively used in petroleum exploration to obtain estimates of porosity, pore size, bound fluids, permeability, and other rock and fluid properties (i.e., "petrophysical data"). For example, it is known that the T2 distribution is closely related to the pore size distribution. Reservoir rocks often exhibit a wide range of T2 due to the difference in pore sizes, with observed T2 s from several seconds down to tens of microseconds. Typically, signals at long T2 (e.g. >100 milliseconds) are from large pores and such fluids are considered to be producible. For shorter T2 signals, 3-50 milliseconds, the fluids are often considered to be bound by capillary force of the pores. For example, in sandstone rocks, signals at T2 below 30 ms are considered bound by capillary force and will not produce. Thus, a cutoff value, $T2_{cut}$, e.g., $T2_{cut}$=30 ms can be used to calculate the bound fluid volume $$BFV = \int_{T2min}^{T2cut} f(T2)dT2 \quad (2)$$

where $f(T2)$ is the T2 distribution and $T2_{min}$ is the minimum T2 obtained in the T2 distribution. If $f(T2)$ is the T2 distribution for the fully saturated sample, then the porosity $\emptyset$ can be obtained by integrating $f(T2)$ according to $$\emptyset = \int_{T2min}^{T2max} f(T2)dT2 \quad (3)$$

where $T2_{max}$ is the maximum T2 exhibited in the sample. Signals with even shorter T2, such as T2<3 milliseconds, are often due to clay bound water or viscous (heavy) hydrocarbon. Some rocks contain significant amount of kerogen that is solid organic matter which may exhibit T2 s down to tens of microseconds. Signals with such short T2 s typically can't be detected by NMR well-logging tools.

General background of nuclear magnetic resonance (NMR) well logging is set forth, for example, in U.S. Pat. No. 5,023,551, the contents of which are herein incorporated by reference. Briefly, NMR well logging includes generating a magnetic field within a borehole (e.g., under the earth's surface), applying a series of electromagnetic pulses to the volume around the borehole, and measuring signals received in response to those pulses to determine characteristics of the volume in proximity to the borehole. Conventional characteristics of the volume measured during NMR well logging include longitudinal ($T_1$) and transverse ($T_2$) relaxation times, as well as diffusion coefficients of the fluid inside the volume. In addition to these one-dimensional (1D) measurements of relaxation times and diffusion coefficients, NMR logs can provide two-dimensional (2D) maps showing the correlation between diffusion and relaxation times (D-$T_2$ or D-$T_1$ maps) and the correlation between longitudinal and transverse relaxation times ($T_1$-$T_2$ maps). These maps are typically used to determine rock properties such as porosity and permeability, as well as fluid properties such as the saturation of oil, water and gas. In some cases, these measurements are used to determine the viscosity of the oil. From these logs, particularly using 2D maps, the water, gas and oil signals can be distinguished, which aids in determining the saturations of the oil, gas and water. In addition, by looking at the position of the oil signal on the map, one can obtain an estimate of the viscosity of the oil, from various correlations to log mean relaxation times.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one non-limiting embodiment of the disclosure a method is disclosed. The method may comprise performing a nuclear magnetic resonance pre-log testing. The method may further comprise identifying a wait time for a portion of a signal from the pre-log testing with a long T1 and T2, value at each depth of the pre-log testing, wherein T1 is defined as a longitudinal relaxation time and T2 is a transverse relaxation time ascertained from the nuclear magnetic resonance pre-log testing. The method may also comprise constructing a logging program with a logging program wait time being consistent with the wait time identified.

In another example embodiment, a second method is disclosed. This method comprises acquiring nuclear magnetic resonance data from a downhole environment and transmitting the data from the downhole environment to surface equipment. The method also comprises performing an analysis on the data to identify optimized configurations for a formation in the downhole environment. The method further comprises performing further nuclear magnetic resonance acquisitions based upon the optimized configurations determined by the analysis performed.

Further features and advantages of the subject disclosure will become more readily apparent from the following detailed description when taken in conjunction with the accompanying drawings.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1:
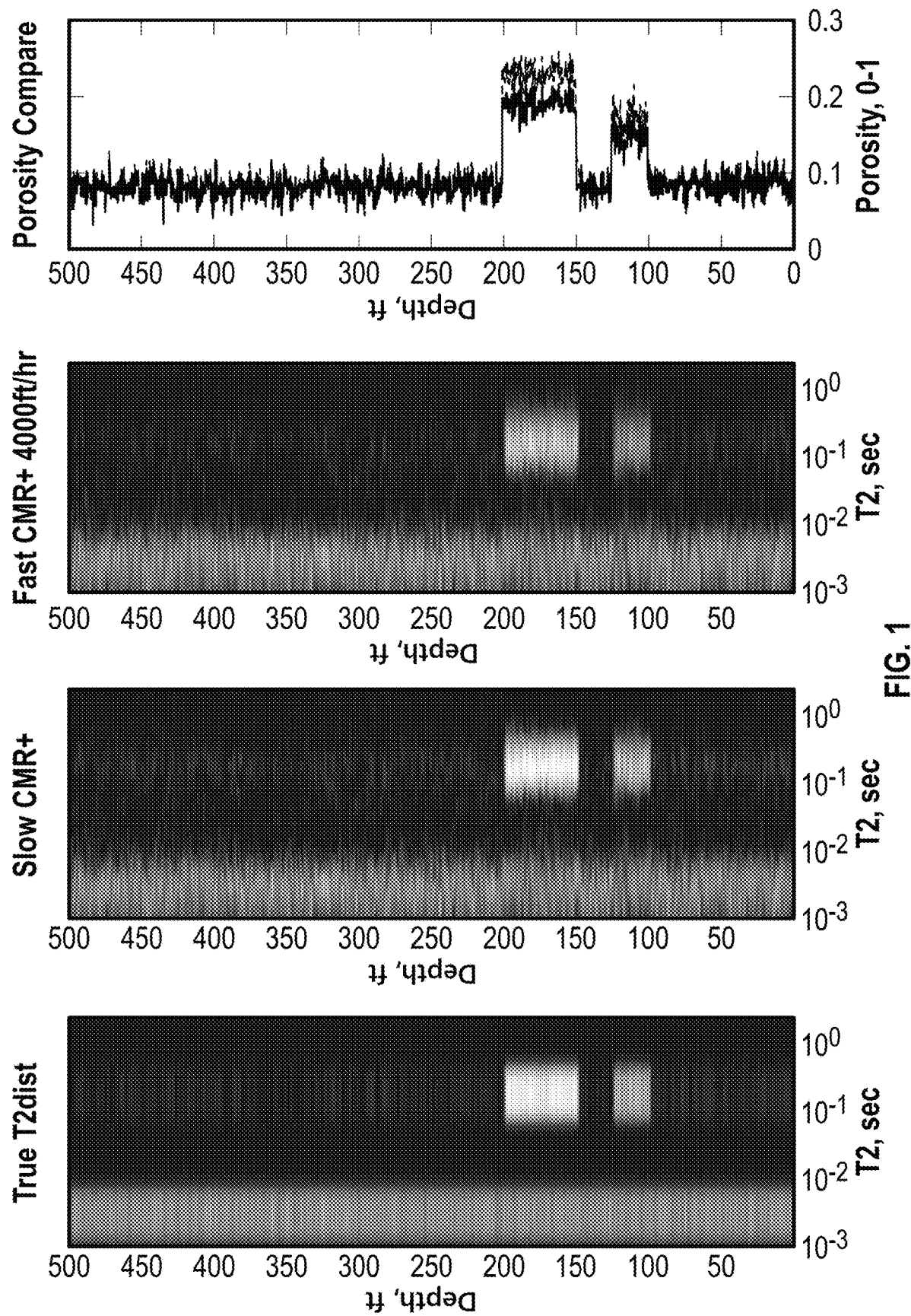
FIG. 1 depicts a simulation of NMR logs at 4000 ft/hr for NMR pre-log obtained during a tool descent. The four panels show, from left, the true T2 distribution, T2 distribution obtained at slow logging speed, T2 distribution obtained at high speed, and porosity obtained at slow (blue) and fast speed (red). For the simulation, TE=0.2 ms, LA=0.5 ft, PT=0.5 s, Necho=2000, v=4000 ft/hr, and the T1/T2 ratio is chosen to be 1.5.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

In a typical well, different geological formations at different depths exhibit vastly different properties in term of their fluid properties (such as viscosity, molecular weight and composition), mineral properties (lithology and mineralogy), and other physical properties (such as density, sound velocity, modulus). As a result, the logging parameters (such as logging speed, instrument setting, optimal NMR acquisition parameters) should vary at different depths. For the conventional well-logging operation, instrument and methodology, however, the dominant method of operation is to set to a standard parameter configuration. Such configuration selection is often rather conservative, typically with an unnecessarily low logging speed. As a result, such parameter configuration is optimized for one set of conditions only, usually the most demanding, and will not be efficient for the rest of the well depths. The subject disclosure describes several methods to optimize well-logging in general and NMR well-logging configuration in order to improve the efficiency of the logging job and to determine fluid/formation properties more efficiently than the current methods.

NMR well-logging uses many NMR pulse sequences. Most of the sequences are based on the CPMG (Carr, Herman Y., and Edward M. Purcell. "Effects of diffusion on free precession in nuclear magnetic resonance experiments." Physical review 94.3 (1954): 630, and Meiboom, Saul, and David Gill. "Modified spin-echo method for measuring nuclear relaxation times." Review of scientific instruments 29.8 (1958): 688-691, both of which are incorporated herein by reference) to acquire a train of echoes. Typical pulse sequences are:

CPMG

CPMG includes an initial 90-degree pulse followed by a train of 180-degree pulses. The time spacing between the adjacent 180-degree pulses is called TE, and the time spacing between the 90-degree pulse and the first 180-degree pulse is typically TE/2. An echo signal is acquired in between the two adjacent 180-degree pulses. The CPMG sequence is often used with many thousands of 180-degree pulses and thus thousands of echoes. This number of echoes is represented by Necho.

LCPMG—Long Wait Time (WT), then Execute a CPMG Pulse Sequence

The WT is often a few seconds, for example, from is to 10 s or even longer. The number of echo (Necho) is often 1000-10000. For example, Necho=5000 is often used for CMR+.

LCPMG+BURST

This is a combination of LCPMG with shorter CPMG sequences (called BURST). The BURST sequence is often executed with short WT, such as 10 ms, or 20 ms, and with fewer echoes, Necho=50. Several BURST sequences can be repeated after LCPMG. Such combination sequences are often used to acquire a signal from unconventional or heavy oil reservoirs. The number of the repeated burst sequences, Nr, is also a configuration parameter that can be optimized. See Hook et al., "Improved precision magnetic resonance, acquisition: application to shale evaluation", SPE-146883 presented at the SPE Annual Technical Conference and Exhibition, Denver, Colo., USA, 30 October-2 November; and Kausik et al., "Characterization of gas dynamics in kerogen nanopores by NMR", SPE-147198 presented at the SPE Annual Technical Conference and Exhibition, Denver, Colo., USA, 30 October-2 November, 2011, pp. 1-16.

T1T2 Sequences

T1T2 sequence measures the T1-T2 correlation spectrum (See Song et al., "T(1)-T(2) correlation spectra obtained using a fast-two-dimensional Laplace inversion", *Journal of Magnetic Resonance* (San Diego, Calif.: 1997), 154(2), 261-268, 2002). It is typically obtained with a series of CPMG sequences with different WTs. For example, the list of the WT can be 1 ms, 5 ms, 20 ms, 100 ms, 500 ms, and 2 s. The Necho for the different sequences could be Necho=50, 50, 100, 500, 1000, 2500.

Such data can be used to obtain the T1-T2 correlation spectrum. Such spectrum can be useful for analysis of unconventional reservoirs. See Song et al., "NMR application in unconventional shale reservoirs—A new porous media research frontier", Progress in Nuclear Magnetic Resonance Spectroscopy 112-113 (2019) 17-33, hereinafter Song 2019.

Diffusion Editing Sequences

Diffusion of the fluid molecules can be measured with the diffusion editing sequences (See Hürlimann et. al. "Hydrocarbon composition from NMR diffusion and relaxation data", Petrophysics 50.02, 2009). It typically uses modified CPMG sequences that are characterized by WT, long echo time (TEL) and short echo time (TE) and also Necho. Several echo train signals are typically acquired with a series of different values of these parameters (such as TEL, and WT). Similar to other sequences, the WT is a key parameter to determine the total time it requires to complete the sequence. Thus, from the speed of acquisition or logging speed perspective, WT is the key parameter, as it is for other sequences.

In summary, for NMR well-logging, the parameters as discussed above, such as WT, Necho, TE, TEL, Nr, etc. are collectively considered a configuration in this subject disclosure. Optimization of pulse sequence includes choosing the most appropriate values for these parameters.

Fluids with different T1/T2 require different pulse sequences/configurations to perform efficiently.

For a fluid sample, its T1 and T2 values determine the signal behavior and thus the method for their optimal acquisition. For example, during the WT, the NMR signal (S) is polarized by the external magnetic field in a fashion described by the below equation:

$$S(WT) = S_{eq}(1 - e^{-WT/T1}) \quad [4]$$

where $S_{eq}$ is the equilibrium signal of the sample. For WT=3×T1, the signal will be within 5% of the equilibrium signal, an accuracy often sufficient for NMR well-logging. Thus, for fluid samples with shorter T1, the necessary wait time can be quite short. On the other hand, for very light oils and gases, T1 can be quite long, such as 3 s. The necessary WT to reach 3*T1 would be WT~10 s. Thus, for such fluid, it is necessary to log very slowly with long WT.

The situation for T2 is similar. During the echo acquisition, the signal decay with a time constant of T2:

$$S(WT) \propto e^{-n*TE/T2} \quad [5]$$

where n is the echo number and TE is the echo spacing. For short T2 samples, a smaller number of echoes are needed to characterize its T2, and a larger number of echoes are needed for longer T2 samples. As a result, the time of optimal echo acquisition is also related to the T2 of the sample.

In a typical well, fluids in different geological formations at different depths may exhibit vastly different properties in term of their viscosity, molecular weight and composition. For example, a light oil reservoir may be sandwiched between many layers of other formations with lower permeability or shales of much shorter T1 and T2. As a result, the optimal NMR acquisition parameters should be different at different depths.

In current NMR well-logging instruments and methodology, the dominant method of operation is to set to a standard parameter configuration, such as the WT, Necho, etc. Such configuration selection is often made by considering the potential formations to be encountered in the specific wells. Since only one configuration can be downloaded to the tool, a rather conservative configuration will be selected in order to cover the potential long T1 and T2 sections with good accuracy, which typically means very long WT. As a result, such logging program won't be efficient for every depth of the logging with a large range of T1 and T2 values.

In an embodiment a method and system to optimize NMR well-logging configuration in order to determine fluid and formation properties more efficiently is described.

Method 1

Perform pre-log, analyze pre-logs to identify the optimized configurations for different parts (depths) of the formation, and execute the optimized configurations at the appropriate depth. The definition of pre-logs includes NMR logs as well as other logs or data obtained from a subsurface. Details of the methods will be described later.

A. Perform NMR pre-log, identify the portion of signal with long T1 and T2, determine the WT to be sufficient to detect those long T1, T2 signals at each depth. Construct a logging program with the proper WT determined from the NMR pre-log. A few predetermined WTs can be used as the appropriate WT.

Implement the variable WT sequence for the up-log with constant logging speed.

Implement the variable WT sequence for the up-log with variable logging speed.

The variable logging speed can be achieved by manual adjustment of the winch or using an automatic winch control.

An efficient time to perform data analysis is after the tool reaches the bottom of the well (TD, total depth). Once the analysis is finished, the up-log may commence with the optimized configuration. Such analysis can also be performed at any time during the down-log.

Here we provide a simulation example to illustrate the Method 1A. In the example, a formation is shown to exhibit a short T2 component (T2~0.005 s) and a longer T2 component at T2=0.2 s, shown in FIG. 1. The four panels show, from left, the true T2 distribution, T2 distribution obtained at low logging speed, T2 distribution obtained at high speed, and porosity obtained at low (blue) and high speed (red). In the zones that contain long relaxation times, porosity at high logging speed is reduced due to the insufficient polarization (red curve is lower than the blue).

Albeit the speed difference, the logarithmic mean of T2 distribution (around 0.2 s) is comparable for both logging runs shown in the middle two panels. This means that although fast logging may not be accurate in porosity, it can be used to determine the presence of the long T2 components. In the above example, since the fast log shows signal at up to about 1 s, one may determine that the WT should be not shorter than 3 s.

Perform pre-log with NMR and neutron porosity tools. Determine the amount of free fluids based on the difference between NMR log and neutron log.

For example, in a formation of clean carbonate and/or sandstone, if the porosity based on the down-log NMR data is much less than the porosity from neutron log at a specific depth, then there may be a significant amount of fluid as free fluid. This is because NMR down-log performed at high speed only measures the bound fluid accurately. The free fluids exhibit longer T1 and the signal is not polarized sufficiently at the high logging speed. Thus, the amount of free fluid is underestimated by the down-log. As a result, the discrepancy between NMR porosity and neutron porosity indicates significant free fluid. Thus, the WT for the corresponding section should be long in the up-log. If porosity is consistent between NMR and neutron down-log, the amount of free fluid is minimal and the short WT should be sufficient.

The neutron log of porosity requires an accurate lithology estimate of the formation. For example, if a carbonate formation is measured with the assumption of sandstone, significant error may be resulted. Some rock formations, such as shales, may exhibit variable lithology or vary rapidly as a function of depth and it would be difficult to accurately determine their lithology for neutron interpretation. In these cases, neutron porosity may be inaccurate and shall not be used alone in comparison with NMR porosity for free fluid estimate; instead, density and lithology logs may be used to get a better estimation of total porosity. In some cases, even if lithology of shale is known, the conventional thermal neutron porosity will likely overestimate the porosity. An epithermal neutron porosity would do better for that purpose. In the case of a gas bearing formation, neutron measurements may also underestimate porosity due to low hydrogen index of gas. In practice, local knowledge is helpful to gauge whether neutron/density porosity would suffice as a benchmark for down-log NMR porosity.

In most development fields, many measurements (wireline logs and LWD logs, including LWD NMR logs) in nearby offset wells are often available to help with the analysis of the down-log, such as to correlate with the down-logs. In those cases, offset well logs may serve for zonal identification, which may be utilized to improve up-log efficiency. For example, there are occasions where down-log may indicate relatively long T2 components in shale sections. If pay zone can be identified by a combination of offset wells, a "fast" sequence can be applied to the shale section, ignoring the occasional long T1 and/or T2 formations in the zone (since these zones have already been identified to be nonproductive and would be bypassed).

Method 2

During the logging (mostly up-log), acquire NMR data, and the data is transmitted to the surface equipment, perform analysis to identify the optimized configurations for the formation, and execute the optimized configurations for further measurement. This optimization process will be continued for the entire logging program.

The analysis can be performed in downhole tools; however, it will be subject to the limited memory and computing capability downhole. The WL logging typically includes high-speed data communication between the downhole tool and surface equipment, and it is more desirable to transmit the data to the surface computer for analysis. It is of course necessary that such analysis is fast so that there is no gap in the downhole data acquisition.

Method 3

Perform the specific analysis (as outlined in the section below: Description of the detailed techniques for Methods 1-4) of the well-logging data from nearby wells (either or both down-logs and up-logs) to determine the optimal configurations for different depths, taken into consideration of potential formation dip and uncertainty, and design the NMR well-logging program, such as with variable WT or sequences.

Perform data analysis of LWD logs and expected fluid properties based on Mud logs etc to determine the optimal polarization time for different depth intervals, taken into consideration potential uncertainties on formation and fluid properties, and design the NMR well-logging program. The uncertainty includes potential formation dip, and depth shifting in different logging conditions. The details of the data analysis are outlined in the section below: Description of the detailed techniques for Methods 1-4.

Method 4

Perform data analysis (as outlined in the section below: Description of the detailed techniques for Methods 1-4) on the fly in the downhole tool and determine the appropriate sequence in real time, optionally leverage the information from the down-log to ensure consistency and to have a look ahead. In addition, the downhole tool transmits the maximum appropriate logging speed to the surface system to optimize operations (change the logging speed at the winch).

Description of the Detailed Techniques Used for the Methods 1-4 Discussed Above

Well-Logging Speed

The use of the efficient pulse sequence can benefit logging operations in two ways.

One way is to maintain a constant design logging speed and the optimal method will result in an improved SNR as the data acquisition is much more efficient. This can be very important in low porosity formations, such as unconventional reservoirs.

The other way to benefit logging operations is to improve logging speed in order to reduce the logging time and therefore the total cost of logging. For example, the logging speed can be substantially increased for the formations with shorter T1 and T2.

The variable logging speed is not typically applied in the current well-logging industry, even though this is possible even with manual control of the winch by a field personnel. The future automated winch control will certainly make such operation much easier and would allow the execution of the optimized logging program with great efficiency and at a reduced cost.

Data Storage

Since the data acquisition program and logging speed may change at different depths, it is necessary that such configuration information is stored for each depth of the data. This configuration information is used for the data analysis both in real-time interpretation and later petrophysical analysis.

Data Analysis for Determining Optimal Sequences Using Inversion Method

Analyze the NMR data (down-log for method 1 and 2, up-log for method 3) to determine the components with long T2 by performing inversion of the CPMG or similar data. In such an embodiment such as described above, a train of echo signal is acquired. The signal amplitude, S, is measured as a function of the echo time, $t_{echo}$ (the time of the echo from the beginning of the first 90-degree pulse), $$t_{echo} = n*TE \qquad (6)$$

where n is the number of echo and TE is the echo spacing. The signal amplitude then follows an exponential decay form, which may be represented as:

$$S(t_{echo}) = S(0)\exp\left(-n*\frac{TE}{T_2}\right), \qquad (7)$$

for a sample with a single T2. For many samples where a range of T2 is present, the total signal is a sum of all T2 components, $$S(t_{echo}) = \int dT_2 f(T_2) \exp\left(-n * \frac{TE}{T_2}\right), \quad (8)$$

where f(T2) is the T2 distribution function. The function $$\exp\left(-n * \frac{TE}{T_2}\right)$$

is called a kernel of the experiment and it describes the signal behavior for a single T2 components. The purpose of inversion is to obtain the T2 distribution $f(T_2)$ from the experimentally acquired data $S(t_{echo})$. We define a kernel function $$K = \exp\left(-n * \frac{TE}{T_2}\right),$$

and thus the equation can be written as $$S(t_{echo}) \int dT_2 f(T_2) K(t_{echo}, T_2). \quad (9)$$

This equation can be used for many other experiments other than CPMG if the kernel function is defined specifically for the experiment.

Typically, the above equation is written in a matrix form in order for numerical analysis. Thus, the signal and T2 distributions are represented by vectors, S and F, respectively, and kernel function is written as a matrix, K where the element of K is defined as $$K_{ij} = \exp\left(-i * \frac{TE}{T_{2j}}\right), \quad (10)$$

where i is the echo number and $T_{2j}$ is the j-th component of the T2 vector. Typically, a T2 vector contains 100 elements with the values logarithmically spaced. Thus, the signal equation (Eq. 8) can be written in a matrix form:

$$S = KF, \quad (11)$$

which can be solved by numerical methods such as Fast Laplace inversion and many other techniques (See Song, "Magnetic Resonance of Porous Media (MRPM): A perspective", J Magn Reson 229 (2013) 12-24, hereinafter Song 2013). Other experiments, such as the measurement of T1, T1-T2 correlation, can all be handled mathematically in a similar fashion to obtain, for example, T1 distribution, T1-T2 correlation spectrum, respectively. Many examples have been covered in Song 2013, Hürlimann et. al. "Hydrocarbon composition from NMR diffusion and relaxation data", Petrophysics 50.02 (2009), and Song 2019. Many techniques have been developed to obtain the T2 distribution from the CPMG echo train data $S(t_{echo})$, such as inversion with Tikhonov regularization (such as Fast Laplace Inversion, described by Song et al. in Journal of Magnetic Resonance 2000, volume 154, pages 261-268, and U.S. Pat. No. 6,462,542 B1), maximum entropy method of inversion, and other methods (reviewed in Song 2013).

Once the T2 distribution is obtained, estimate of the signal at long T2 can be determined by integration within a range (T2r1 to T2r2):

$$\Phi_r = \int_{T2r1}^{T2r2} f(T2) dT2$$

For example, if T2r1=0.1 s and T2r2=0.5 s, then $\Phi_r$ is the signal at T2 above 0.1 s and below 0.5. In case this signal is significant while no signal is observed above T2=0.5 s, the longest T2 is 0.5 s and thus the WT can be set at 2 s.

Other methods can be used to determine the edge of the longest T2 (T2L) by edge detection etc. The corresponding WT can be determined by WT=4×T2L or 5×T2L. The coefficient (4 or 5) can be determined by local conditions or experience.

Once the WT for one depth is determined, the same calculation can be performed for all depths in a similar fashion. The result is a list of optimal WT values for the entire logging depths.

Further adjustment to the optimal WT list can be made to reduce the number of WT changes and smooth out the variations in WT if desired. For example, it is possible to establish only a few legitimate WT choices, such as 1 s, 2 s, 5 s and 10 s to reduce the number of switches.

A few specific cases are discussed below related to the NMR logging different speeds as they are relevant to this disclosure. For NMR well-logging at a finite speed v, the signal exhibits another decay because the RF coil is moving relative to the wellbore, and this decay can be approximated as following:

$$S \propto 1 - \frac{v t_{echo}}{L_A}, \quad [12]$$

where $L_A$ is the length of the coil along the logging direction. For example, when the coil moves its full length, the signal will essentially decay to zero. This is defined as a decay mechanism motion effect, and define a function Kv:

$$K_v = 1 - \frac{v t_{echo}}{L_A}. \quad [13]$$

Another effect that is important for NMR well-logging is the length of the prepolarization magnet ($L_{pre}$) which is the portion of magnet proceeding the RF coil along the direction of the logging. For CMR+ tool, during the up-log, the length of the prepolarization is about 2 ft, where for down-log, the prepolarization length is approximately 0.5 ft. As the tool moves into a fresh part of the formation, the spin polarization of the formation (which gives rise to NMR signal) is polarized for a time of PT. This PT is dependent on many factors, such as WT, total echo time, $L_{pre}$, and logging modes. The effective signal after the prepolarization is governed approximately by this equation:

$$K_{pre} = 1 - \exp\left(-\frac{PT}{T_1}\right). \quad [14]$$

As a result, the detected signal can be modeled as a product of the three effects, $K_2$, $K_v$ and $K_{pre}$, where $K_2$ is the kernel that describes T2 relaxation process shown in Eq (10)

For data inversion, one may choose to use K2 alone, or to include the speed effect (K2×Kv as the kernel), or to include the full prepolarization effect ($K_2 \times K_v \times K_{pre}$ as the kernel). When logging speed is high, the inclusion of $K_v$ and $K_{pre}$ may also cause error in porosity and T2 distributions, in particular the long T2 components. For FIG. 1, the inversion was performed with $K_2 \times K_v$. The reduction of porosity at the long T2 zones are due to the reduced polarization of the long T2 peak at the speed of 4000 ft/hr.

Data Analysis for Determining Optimal Sequences Based on Classification

The inversion methods used in the previous data analysis (above) may require significant computation and memory. The method discussed below can be performed with significant less computation resources. This approach uses a classification method to partition samples (data) into a few distinctive classes with the purpose of enhancing measurement efficiency.

For example, three classes (A, B, C) of samples are defined:
A: T1 and T2 components that span the entire region from 0.001 to 1 s, and significant components with T1 and T2 longer than 0.1 s;
B: T1 and T2 components that are less than 0.1 s, with components of large T1/T2 ratio; and
C: T1 and T2 components only with short T1 and T2 components less than 0.1 s.

For each class, the optimal sequence can be determined. For example, for a class C sample, since the T1 and T2 are less than 0.1 s, the WT is no longer than 1 s, and the total recorded echo time is no longer than 0.2 s (thus for TE=0.2 ms, Necho-1000). In order to measure T1, the WT list could use short times, such as 1 ms, 5 ms, 20 ms, 100 ms, 500 ms, and 1 s.

In another example, for a class A sample, significant longer WT and echo times will have to be used, for example, WT of 3-4 s, Necho-5000. For the measurement of T1, the WT list will need to have longer time values, such as 1 s, 2 s, 4 s, etc. in addition to the list for class C.

For class B, even though the long T1 may requires long WT, however, the T2 is relatively short and thus the number of echoes may be reduced.

A significant part of this method is to determine a sample class from the acquired NMR data directly without inversion. Such classifications can be achieved by machine learning models, such as supported vector, clustering, decision-tree, binary or multiclass classification, etc. The building of these models can be time-consuming and may require surface computers or servers or cloud computing. In other instances, the models themselves are relatively compact and can be stored with limited memory footprint. The application of the models (often called inference) to the NMR data typically does not require heavy computation and can be implemented and performed on imbedded processors such as microprocessors and FPGAs. These models are highly efficient in computation and can be executed continuously on the logging devices. The details of this method and implementation has been discussed in co-owned PCT Application No. PCT/US2019/032337, entitled "Adaptive downhole acquisition system", filed May 15, 2019, the contents of which are herein incorporated by reference in its entirety.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Figure 2:
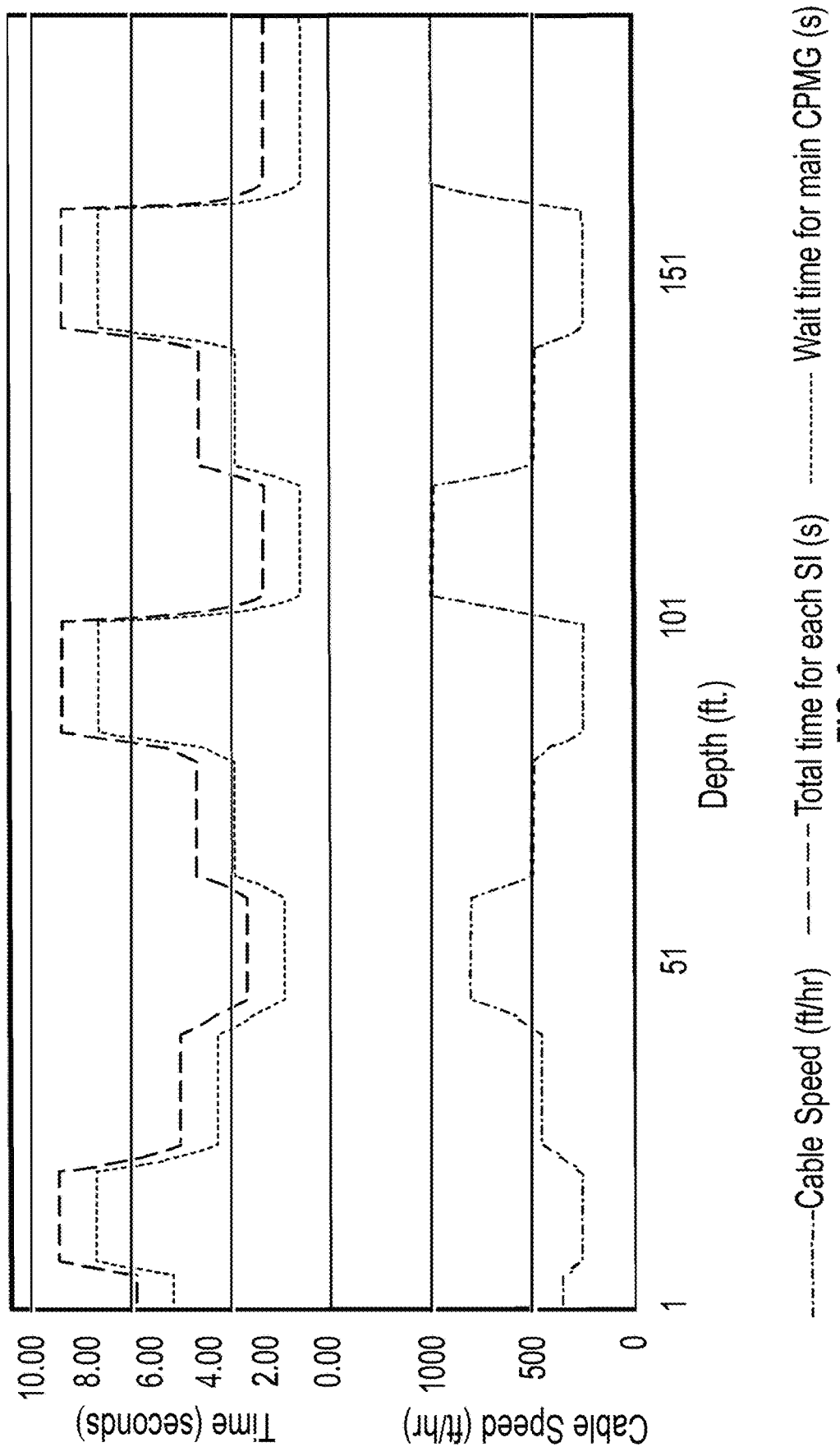
FIG. 2 depicts a continuous CMR logging with variable cable speed. The fixed parameters are sampling interval and pulsing sequence. The variable wait time for the main CPMG is an output log.
Figure 3:
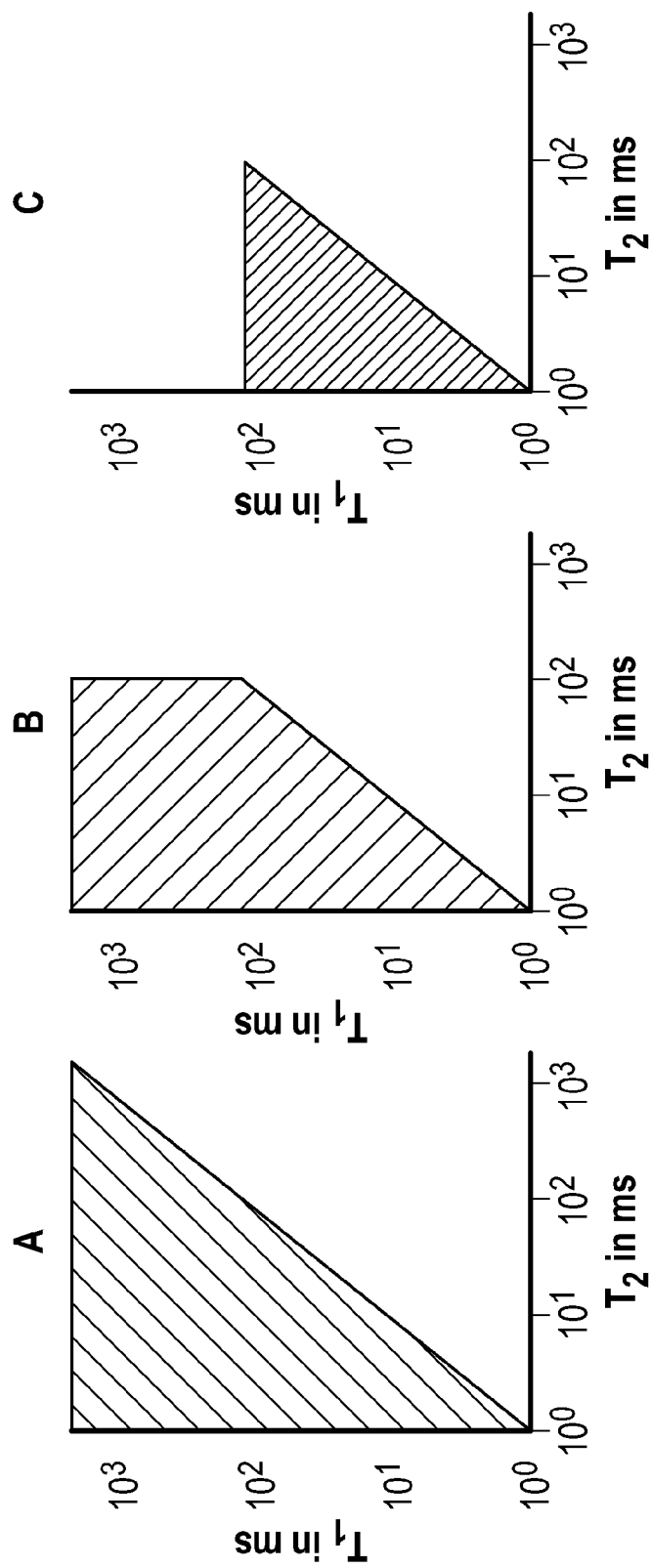
FIG. 3 depicts three classes of relaxation behavior.
Figure 4:
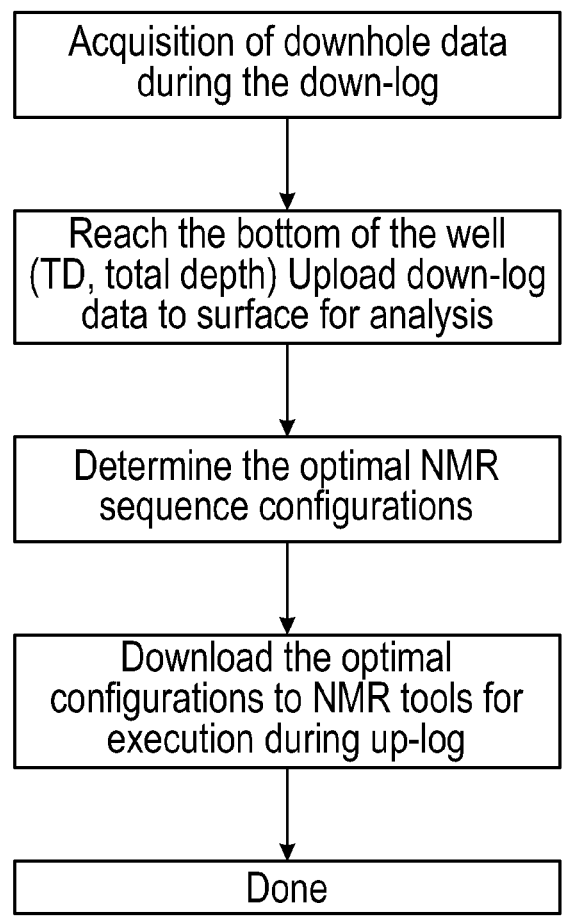
FIG. 4 depicts a flow chart of an optimization program for a method 1 described below. The downhole data includes NMR data, neutron data, gamma ray, resistivity etc.
Figure 5:
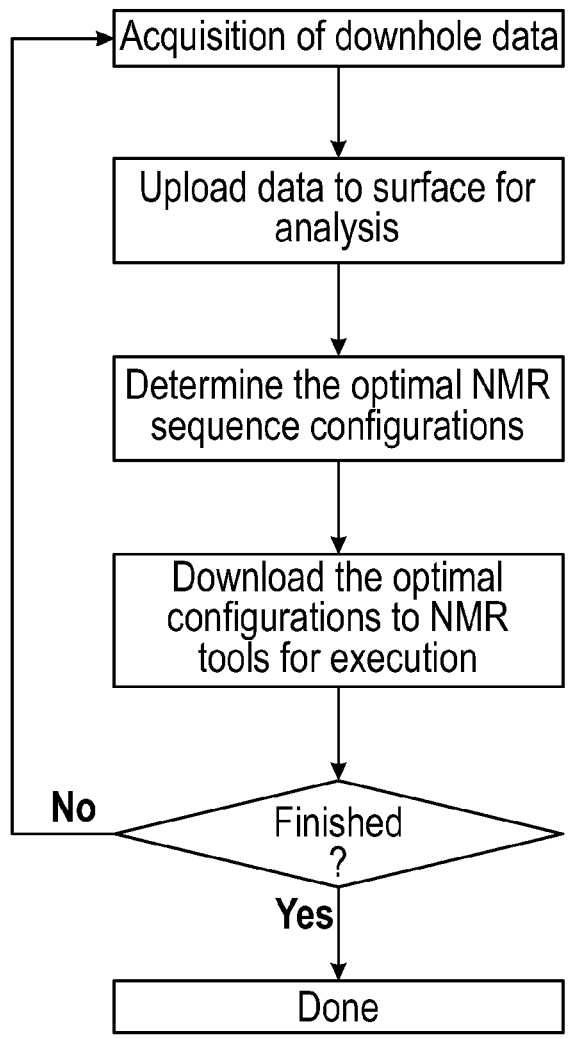
FIG. 5 depicts a flow chart of the optimization program for method 2 described below.
Figure 6:
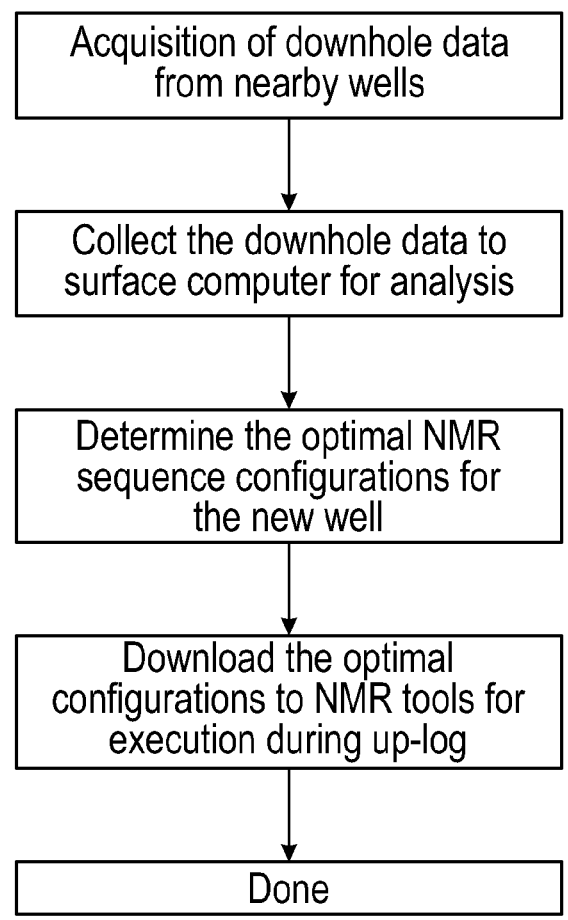
FIG. 6 depicts a flow chart of the optimization program for method 3 described below.

FIG. 2 shows variations in cable speed, total time for each sample interval (SI), and wait time for a main CPMG pulse sequence at different depths (in feet) of a well. As can be seen, as the cable speed increases, the sample time and wait times decrease, and vice versa. Therefore, a variable speed logging operation can take advantage of the changes in timings based on the speed of the cable to make the total operation more time-effective and cost-effective than in fixed-speed operations. It should be appreciated that the example illustrated in FIG. 2 of depth being in feet is provided only as an index, and the depth of the well may be more or less than in the illustrated example, and may be in any appropriate measurement, e.g., feet, meters, etc.

In one non-limiting embodiment of the disclosure a method is disclosed. The method may comprise performing a nuclear magnetic resonance pre-log testing. The method may further comprise identifying a wait time for a portion of a signal from the pre-log testing with a long T1 and T2, value at each depth of the pre-log testing, wherein T1 is defined as a longitudinal relaxation time and T2 is a transverse relaxation time ascertained from the nuclear magnetic resonance pre-log testing. The method may also comprise constructing a logging program with a logging program wait time being consistent with the wait time identified.

In another example embodiment, the method may be performed wherein the wait time is a predetermined wait time.

In another example embodiment, the method may be performed wherein the wait time is a variable wait time sequence.

In another example embodiment, the method may be performed wherein the wait time is determined from an up-log with constant logging speed.

In another example embodiment, the method may be performed wherein the wait time is determined from an up-log with variable logging speed.

In another example embodiment, the method may be performed wherein the variable logging speed is determined by manual adjustment of a winch.

In another example embodiment, the method may be performed wherein the variable logging speed is determined by adjustment of an automatic winch control.

In another example embodiment, a second method is disclosed. This method comprises acquiring nuclear magnetic resonance data from a downhole environment and transmitting the data from the downhole environment to surface equipment. The method also comprises performing an analysis on the data to identify optimized configurations for a formation in the downhole environment. The method further comprises performing further nuclear magnetic resonance acquisitions based upon the optimized configurations determined by the analysis performed.

In another example embodiment, the method may be performed wherein the surface equipment is a computer.

In another example embodiment, the method may be performed wherein the performing the further nuclear magnetic resonance acquisitions based upon the optimized configurations does not provide an appreciable delay between the acquiring nuclear magnetic resonance data and the performing further nuclear magnetic resonance acquisitions.

In another example embodiment, the method may be performed wherein the acquiring nuclear magnetic resonance data is performed on an up-log tool motion.

In another example embodiment, the method may be performed wherein the acquiring nuclear magnetic resonance data is performed on a down-log tool motion.

In another example embodiment, the method may be performed wherein performing the analysis on the data to identify optimized configurations for a formation in the downhole environment is performed on each successive nuclear magnetic resonance tool run.

In another example embodiment, the method may be performed wherein the performing further nuclear magnetic resonance acquisitions based upon the optimized configurations determined by the analysis performed is performed after each successive nuclear magnetic resonance tool run.

Although only a few examples have been described in detail above, those skilled in the art will readily appreciate that many modifications are possible in the examples without materially departing from this subject disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed is:

1. A method, comprising,
    performing a nuclear magnetic resonance pre-log testing;
    identifying a parameter for a portion of a signal from the pre-log testing with a long T1 and T2 value at each depth of the pre-log testing, T1 being a Longitudinal relaxation time, T2 being a transverse relaxation time ascertained from the nuclear magnetic resonance pre-log testing, the identifying a parameter including identifying a Carr-Purcell-Meiboom-Gill (CPMG) pulse sequence wait time sufficient to detect the long T1 and T2;
    determining which of the detected long T1 and T2 is longer;
    identifying the determined longer of the detected long T1 and T2 as a target wait time;
    constructing a logging program for a well-logging tool to improve a logging signal-to-noise (SNR) ratio or to reduce a logging time, the constructing including selecting, from among a plurality of predefined series of logging program CPMG wait times, a logging series of logging program CPMG wait times, the logging series being selected such that a shortest wait time in the selected logging series is a shortest wait time among the plurality of predefined series that is also longer than the target wait time; and
    performing a logging operation in accordance with the constructed logging program, the performing the logging operation including setting CMPG wait times of the logging operation to be the selected logging series of logging program CPMG wait times.

2. The method according to claim 1, wherein the identified CPMG wait time is a constant value selected based on the pre-log testing.

3. The method according to claim 1, wherein the identified CPMG wait time is a variable wait time sequence.

4. The method according to claim 1, wherein the identified wait time is determined for an up-log with constant logging speed.

5. The method according to claim 1, wherein the identified CPMG wait time is determined for an up-log with variable logging speed.

6. The method according to claim 5, wherein the variable logging speed is determined by manual adjustment of a winch.

7. The method according to claim 5, wherein the variable logging speed is determined by adjustment of an automatic winch control.

8. The method of claim 1, wherein the parameter comprises at least one of: echo spacing, number of echoes, number of repeats, number of wait times, or combinations thereof.

9. The method of claim 1, further comprising using offset well logs, nearby well logs, LWD logs, or combinations thereof to enhance the logging program.

10. A method, comprising:
    acquiring nuclear magnetic resonance data from a downhole environment;
    transmitting the data from the downhole environment to surface equipment;
    performing an analysis on the data to identify optimized configurations for a formation in the downhole environment, the analysis including identifying a parameter for a portion of a signal from the acquiring the nuclear magnetic resonance data with a long T1 and T2 value at each depth of the acquiring the nuclear magnetic resonance data, T1 being a Longitudinal relaxation time, T2 being a transverse relaxation time ascertained from the acquiring the nuclear magnetic resonance data, the optimized configurations including selecting a longer of the T1 and T2 values to determine wait times for further nuclear magnetic resonance acquisitions to improve a logging signal-to-noise (SNR) ratio or to reduce a logging time, the selecting a longer of the T1 and T2 values comprising:

determining which of the detected long T1 and T2 is longer; and identifying the determined longer of the detected long T1 and T2 as a target wait time; and performing the further nuclear magnetic resonance acquisitions from the downhole environment based upon the optimized configurations determined by the analysis performed, the performing the further nuclear magnetic resonance acquisitions including:

selecting, from among a plurality of predefined series of logging program wait times, a logging series of logging program wait times, the logging series being selected such that a shortest wait time in the selected logging series is a shortest wait time among the plurality of predefined series that is also longer than the target wait time; and setting the wait times of the further nuclear magnetic resonance acquisitions to be the selected logging series of logging program wait times.

11. The method according to claim 10, wherein the surface equipment is a computer.

12. The method according to claim 10, wherein the performing further nuclear magnetic resonance acquisitions based upon the optimized configurations does not increase a delay between the acquiring nuclear magnetic resonance data and the performing further nuclear magnetic resonance acquisitions.

13. The method according to claim 10, wherein the acquiring nuclear magnetic resonance data is performed on an up-log tool motion.

14. The method according to claim 10, wherein the acquiring nuclear magnetic resonance data is performed on a down-log tool motion.

15. The method according to claim 10, wherein the performing analysis on the data to identify optimized configurations for a formation in the downhole environment is performed on each successive nuclear magnetic resonance tool run.

16. The method according to claim 15, wherein the performing [the] further nuclear magnetic resonance acquisitions based upon the optimized configurations determined by the analysis performed is performed after each successive nuclear magnetic resonance tool run.

* * * * *